(12) United States Patent
Lentz et al.

(10) Patent No.: US 9,998,946 B1
(45) Date of Patent: Jun. 12, 2018

(54) MOBILE LOCAL DELIVERY SERVER

(71) Applicants: Robert L. Lentz, Severna Park, MD (US); Fraser R. Chisholm, Lantau Island (HK); Scott J. Zogg, Cedar Rapids, IA (US)

(72) Inventors: Robert L. Lentz, Severna Park, MD (US); Fraser R. Chisholm, Lantau Island (HK); Scott J. Zogg, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 420 days.

(21) Appl. No.: 14/529,354

(22) Filed: Oct. 31, 2014

(51) Int. Cl.
*H04W 4/04* (2009.01)
*H04W 28/02* (2009.01)
*H04W 84/12* (2009.01)
*H04B 7/185* (2006.01)

(52) U.S. Cl.
CPC .... *H04W 28/0289* (2013.01); *H04B 7/18506* (2013.01); *H04W 84/12* (2013.01)

(58) Field of Classification Search
CPC .. H04W 28/0289; H04W 84/12; H04L 67/12; H04L 67/18; H04B 7/18506; G06F 19/00
See application file for complete search history.

(56) References Cited

U.S. PATENT DOCUMENTS

| 7,949,335 | B2 | 5/2011 | Stefani et al. |
| 8,768,534 | B2 | 7/2014 | Lentz |
| 2009/0179114 | A1* | 7/2009 | Conner ............... B64D 45/0015 244/189 |
| 2011/0257834 | A1* | 10/2011 | Hebb ..................... G06Q 10/08 701/31.4 |
| 2013/0208111 | A1* | 8/2013 | Kidd ...................... B64D 45/00 348/143 |
| 2013/0308470 | A1* | 11/2013 | Bevan ................... H04W 64/00 370/252 |
| 2014/0136730 | A1* | 5/2014 | Wahler .................... H04W 4/04 709/242 |
| 2014/0258257 | A1* | 9/2014 | Schowalter ....... G06F 17/30386 707/705 |
| 2015/0120097 | A1* | 4/2015 | Hathaway ............... B64C 19/00 701/14 |
| 2015/0379408 | A1* | 12/2015 | Kapoor ................... G01W 1/10 706/46 |
| 2016/0077523 | A1* | 3/2016 | Zygmant .............. G08G 5/0013 701/2 |
| 2016/0205724 | A1* | 7/2016 | Shi ..................... H04B 7/18506 370/254 |
| 2017/0134087 | A1* | 5/2017 | Law ................... H04B 7/18506 |

\* cited by examiner

*Primary Examiner* — Charles C Jiang
*Assistant Examiner* — Ryan Kavleski

(57) ABSTRACT

A mobile local delivery server (MLDS) may include a system controller configured to determine an anticipated location of an aircraft based on information received from one or more flight information sources and a data loading processor communicably coupled with the system controller and configured to execute one or more software applications. The one or more software applications may configure the MLDS to exchange data with the aircraft. The MLDS may further include a mass storage device communicably coupled with the data loading processor and configured to store data exchanged between the MLDS and the aircraft.

19 Claims, 3 Drawing Sheets

MOBILE LOCAL DELIVERY SERVER

BACKGROUND

Modern day aircrafts transmit and receive a relatively large amount of data. The data received by (or loaded on) the aircraft may include, for example, Electronic Flight Bag (EFB), In-flight Entertainment (IFE) data, cabin system updates, navigation database updates, flight release paperwork. The data transmitted from (or loaded off) an aircraft may include, for example, point-of-sale (POS) information, aircraft performance data, and Flight Operational Quality Assurance (FOQA).

Current methods of exchanging the large amount of data while the aircraft is in the air are expensive. As an alternative, data may be exchanged while the aircraft is on the ground. While the aircraft is on the ground, terrestrial cellular systems and/or systems using Wi-Fi signals may be used for data transfer. However, terrestrial cellular systems have a relatively low data transfer rate, and, as a result, all data may not be transferred to and from the aircraft while the aircraft is on the ground between flights. Wi-Fi systems may have a relatively higher data transfer rate than the terrestrial cellular systems, but Wi-Fi systems may be expensive to use and bottlenecks may be present in the terrestrial network that connects to the Wi-Fi systems. These network bottlenecks may reduce the data transfer rate.

What is needed, then, are systems and methods for transferring data to and from the aircraft while the aircraft is on the ground.

SUMMARY

Exemplary embodiments may be directed to a mobile local delivery server (MLDS) including a system controller configured to determine an anticipated location of an aircraft based on information received from one or more flight information sources and a data loading processor communicably coupled with the system controller and configured to execute one or more software applications. The one or more software applications may configure the MLDS to exchange data with the aircraft. The MLDS may further include a mass storage device communicably coupled with the data loading processor and configured to store data exchanged between the MLDS and the aircraft.

Exemplary embodiments may also be directed to a method of operating a mobile local delivery server (MLDS). The method may include receiving information from one or more flight information sources, determining, using a system controller of the MLDS, an anticipated location of an aircraft based on the received information, obtaining at least a portion of data to be loaded on the aircraft, storing the obtained data on a mass storage device of the MLDS, and executing, using a data loading processor of the MLDS, one or more software applications that configure the MLDS to load the obtained data on the aircraft.

Example embodiments may be directed to a computer-program product for operating a mobile local delivery server (MLDS). The computer-program product may include a non-transitory computer-readable storage medium having instructions stored thereon. The instructions may be executed by one or more processors of a computer via which the computer-readable medium is accessed and may cause the computer to receive information from one or more flight information sources, determine, using a system controller of the MLDS, an anticipated location of an aircraft based on the received information, obtain at least a portion of data to be loaded on the aircraft prior to the aircraft arriving at the anticipated location, store the obtained data on a mass storage device of the MLDS, and execute, using a data loading processor of the MLDS, one or more software applications that configure the MLDS to load the obtained data on the aircraft.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION OF EXEMPLARY EMBODIMENTS

Figure 1:
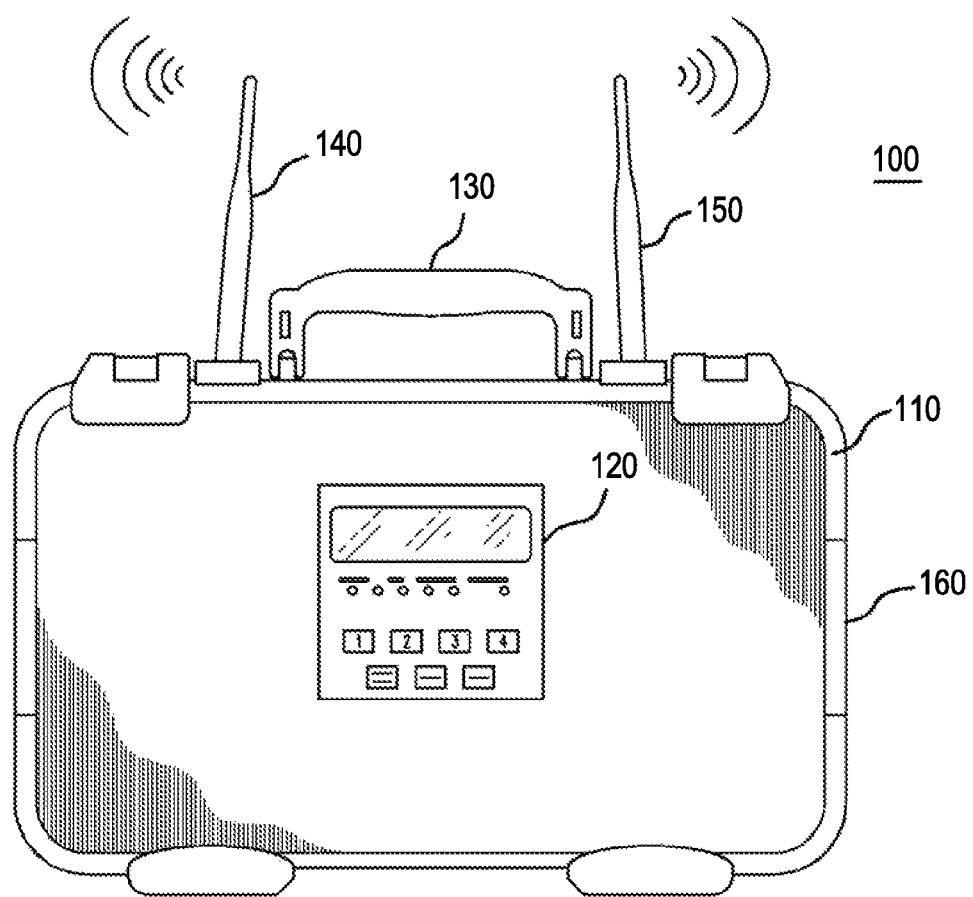
FIG. 1 illustrates a mobile local delivery server, according to exemplary embodiments.

It is to be understood that the following disclosure describes several exemplary embodiments for implementing different features, structures, or functions of the present disclosure. Exemplary embodiments of components, arrangements, and configurations are described below to simplify the present disclosure; however, these exemplary embodiments are provided merely as examples and are not intended to limit the scope of the present disclosure. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and the claims to refer to particular components. As one skilled in the art will appreciate, various entities may refer to the same component by different names, and as such, the naming convention for the elements described herein is not intended to limit the scope of the present disclosure, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

FIG. 1 illustrates a mobile local delivery server (MLDS) 100, according to exemplary embodiments. The MLDS 100 may include a chassis 110, a control panel 120, a handle 130, a Wi-Fi antenna 140, a cellular antenna 150, and charging/communication ports 160.

The chassis 110 may be of any durable material, such as plastic or metal, and may house the components of the MLDS 100. The handle 130 may facilitate transporting the MLDS 100. The MLDS 100 may be portable and relatively light weight and may thus be transported with relative ease.

The control panel 120 may include a user interface for a user to control and interact with the MLDS 100. The user interface may include one or more buttons, a touchscreen, light emitting diodes (LEDs), a display panel, knobs, switches, or other mechanisms to facilitate the user's interaction with the MLDS 100. In an exemplary embodiment, the control panel 120 may be absent and a user may control and interact with the MLDS 100 wirelessly.

The MLDS 100 may also include one or more antennas (two antennas 140, 150 are shown) for wireless communications. For example, a Wi-Fi antenna 140 may be used for communicating over a Wi-Fi network, and a cellular antenna 150 may be used for communicating over a cellular network. However, it should be noted that the MLDS 100 may include a single antenna or more than two antennas for communication and may also use other modes of wireless or wired communication.

The charging/communication ports 160 may enable the MLDS 100 to be charged by external power sources, such as an external AC or wall socket. The charging/communication ports 160 may include, for example, a Universal Serial Bus (USB) port(s), Ethernet ports(s) (such as the RJ45), data transmission connections, external Wi-Fi or Internet connection port(s), and similar port(s) via which the MLDS 100 may communicate with other devices. The MLDS 100 may also be used to charge other devices via the charging/communication ports 160.

Figure 2:
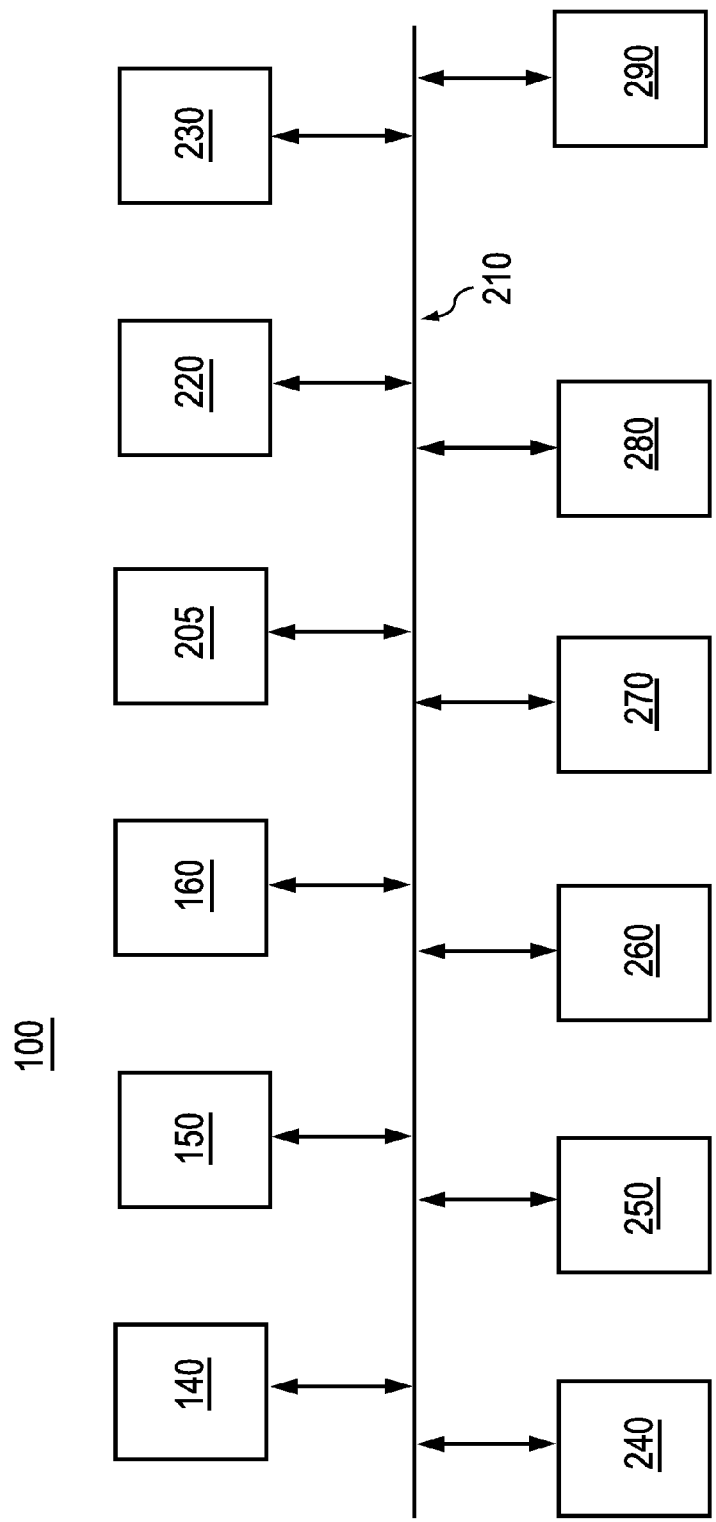
FIG. 2 illustrates a block diagram indicating the various components of the mobile local delivery server of FIG. 1, according to exemplary embodiments.

FIG. 2 illustrates a block diagram indicating the various components of the mobile local delivery server (MLDS) 100, according to exemplary embodiments. The MLDS 100 may include a bus 210, a system controller 220, memory 230, a sensor unit 250, a user interface 260, a communication interface 270, a power supply unit 280, and a communication router 290 in addition to the Wi-Fi antenna 140, the cellular antenna 150, and the charging/communication ports 160.

The bus 210 may permit communication among the various components of the MLDS 100. The system controller 220 may include one or more processors configured to execute instructions stored in the memory 230 in order to operate the MLDS 100. The system controller 220 may be implemented in a hardware circuit including custom VLSI circuits or gate arrays, off-the-shelf semiconductors such as logic chips, transistors, or other discrete components, as are known in the art. The system controller 220 may also be implemented in programmable hardware devices such as field programmable gate arrays, programmable array logic, programmable logic devices or the like. The memory 230 may be a random access memory (RAM), a read-only memory (ROM) or any type of dynamic storage device or static storage device that may store instructions for execution by the system controller 220.

The communication router 290 may include one or more devices that may route, transmit and receive data to and from the MLDS 100. The communication router 290 may be configured to interface with any network and/or communications station, and may be implemented in hardware and/or software. The system controller 220 may control the operation of the communication router 290. The communication router 290 may transmit and receive transmissions via the antennas 140, 150. The communication router 290 may collaborate with the communication interface 270 for communication over a network. In an exemplary embodiment, the communication interface 270 may include a modem or other communication devices that may permit the communication router 290, and thus the MLDS 100, to communicate over a variety of communication networks.

The communication interface 270 may permit data from the MLDS 100 to be transmitted using a communications protocol different from the communications protocol in which the MLDS 100 receives data. For example, data may be received based on Internet Protocol (IP), whereas data may be transmitted using Aircraft Communications Addressing and Reporting System (ACARS). The communication interface 270 may therefore be configured to translate the IP packets into those capable of being sent through the ACARS network, and conversely, to receive the ACARS packets and translate the information to an IP format. In an exemplary embodiment, the system controller 220 may execute instructions that may be read into the memory 230 from one or more other storage devices on the MLDS 100 or from one or more external memory devices via the communication interface 270.

The sensor unit 250 may include one or more sensors or sensing logic that may receive one or more signals for operating the MLDS 100. Alternatively or additionally, the MLDS 100 may receive one or more signals via external sensors connected to the sensor unit 250. In an exemplary embodiment, the sensor unit 250 may operate the MLDS 100 based on one or more safety-of-flight indicators. A safety-of-flight indicator may be one of a signal from a weight-on-wheels sensor that the aircraft's wheels are down or that the aircraft's wheels are up, a signal from a sensor that indicates that the aircraft has pulled away from a gate or that the aircraft has pulled up to a gate, a signal from a cabin door sensor that the aircraft's cabin doors are closed or are open, a signal from the aircraft's cockpit, a signal from the aircraft's crew station, or a signal from a pressure cabin or atmospheric pressure sensor.

Based on the received signal, the MLDS 100 may, for example, power on or off, gather data to be transmitted to the aircraft, or initiate/end exchange of data between the MLDS 100 and the aircraft. In an exemplary embodiment, the MLDS 100 may operate automatically (e.g., without operator intervention) upon receiving the one or more signals.

The user interface 260 may be located on the control panel 120 or the user interface 260 may be the control panel 120. The user interface 260 may permit a user to input information to the MLDS 100 and/or receive information from the MLDS 100. The user interface 260 may include, for example, an electronic display, a microphone, a touchpad, a keypad, a keyboard, a mouse, a pen, stylus, a voice recognition device, a buttons, and/or one or more speakers.

The power supply unit 280 may enable the MLDS 100 to be powered by AC and/or DC power. The power supply unit 280 may also permit the charging of the MLDS 100 batteries. The DC power capability may enable the MLDS 100 to operate as a portable apparatus, relatively free of any power lines, harnesses, or cords. In addition, the power supply unit 280 may work in conjunction with charging ports 160 to enable charging of external devices. The power supply unit 280 may control power supplied to the MLDS 100 and may allow a user to visually verify the power level of the MLDS 100.

According to exemplary embodiments, the MLDS 100 may be configured to anticipate the airport gate or other locations (e.g., remote parking bays) on the airport apron where an arriving aircraft may be parked. The MLDS 100 may anticipate the location based on a variety of flight information sources, such as, flight schedules, gate assignments, aircraft manufacturer and type, Air Traffic Control (ATC) directives, or flight dispatch. For instance, the system controller 220 may be configured to execute one or more algorithms that may anticipate the location where an aircraft may be parked based on the inputs received from one or more flight information sources. The MLDS 100 may also anticipate the location at which the aircraft may be parked based on historic information, for example, past flight schedules or past gate assignments. The information may be transmitted to the MLDS 100 in "real time" or the information may be stored in one or more databases which the MLDS 100 may look up at predetermined intervals. The one or more algorithms may also utilize data from the flight information sources to anticipate the time period for which the aircraft may be parked at the anticipated location. The MLDS 100 may receive the data from the flight information sources via a ground cellular service, a wired internet connection, or a Wi-Fi connection. The anticipated time and/or place may be displayed on the control panel 120.

Because it may be possible to anticipate the location where the aircraft may be parked and/or the time period for which the aircraft may be parked, it may be possible to "pre-stage" the data to be loaded on the aircraft. In other words, based on the anticipated parking location and/or time, the data (or at least a portion thereof) to be loaded on the aircraft, may be obtained and stored on the MLDS 100 prior to the aircraft arriving at the anticipated location. This may further reduce the time required to load data to the aircraft since most, if not all, of the data to be loaded may be available before the aircraft has arrived. In another exemplary embodiment, an operator of the MLDS 100 may specify the particular aircraft type for which data is to be pre-staged via the control panel 120 or the MLDS 100 configuration may be set up remotely and control signals may be wirelessly transmitted to the MLDS 100. The MLDS 100 then may gather the data to be loaded based on one or more of the above-mentioned flight information sources.

The manner and/or format in which data may be loaded on (transmitted to and/or stored on an aircraft) an aircraft may be specific to aircraft manufacturer. Also, the manner and/or format in which data may be loaded on an aircraft may be different for different aircrafts from the same aircraft manufacturer. The MLDS 100 may include a data loading processor 205 which, under control of the system controller 220, may be configured to execute one or more software applications for exchanging (loading and receiving) data with an aircraft based on the aircraft type and/or aircraft manufacturer. The data loading processor 205 may be configured to run a variety of software applications and, as a result, the MLDS 100 may be used with a variety of different aircrafts from different manufacturers. The data loading processor 205 may be implemented in a hardware circuit including custom VLSI circuits or gate arrays, off-the-shelf semiconductors such as logic chips, transistors, or other discrete components, as are known in the art. The data loading processor 205 may also be implemented in programmable hardware devices such as field programmable gate arrays, programmable array logic, programmable logic devices or the like.

The data loading processor 205 may be configured from executing one software application for loading data on one type of aircraft to executing a different software application for loading data on another type of aircraft, from the same or different manufacturer, relatively quickly. As a result, the MLDS 100 may be switched from operating with one aircraft to operating with a different aircraft from the same or different manufacturer in a relatively short time, thereby resulting in a substantially reduced "down time" or a "reconfiguration" time of the MLDS 100. The data loading processor 205 may be configured to execute software applications for loading data on older "legacy" aircrafts along with the newer next generation aircraft.

Also included in the MLDS 100 is a mass storage device 240 that may store thereon a relatively large and diverse amount of data that may be exchanged between the MLDS 100 and the aircraft. The mass storage device 240 may be any physical data storage device (e.g., hard drives, network drives, etc.) that may store the data that is exchanged between the MLDS 100 and the aircraft. The data may be exchanged at a relatively high data rate between the MLDS 100 and the aircraft using, for example, the Wi-Fi antenna 140 of the MLDS 100. In an exemplary embodiment, data may be exchanged with the aircraft using one or more Terminal Wireless LAN Units (TWLUs) on-board the aircraft. The high data rate may be achieved due to the proximity of the MLDS 100 to the aircraft and because data to be loaded on/off an aircraft may be locally stored on the mass storage device 240. A direct communication link may thus be established between the MLDS 100 and the aircraft, and network bottlenecks which may reduce data transfer rate may be minimized. After the aircraft leaves the gate or after all data has been loaded on/off the aircraft, the data from the mass storage device 240 may be further processed.

Figure 3:
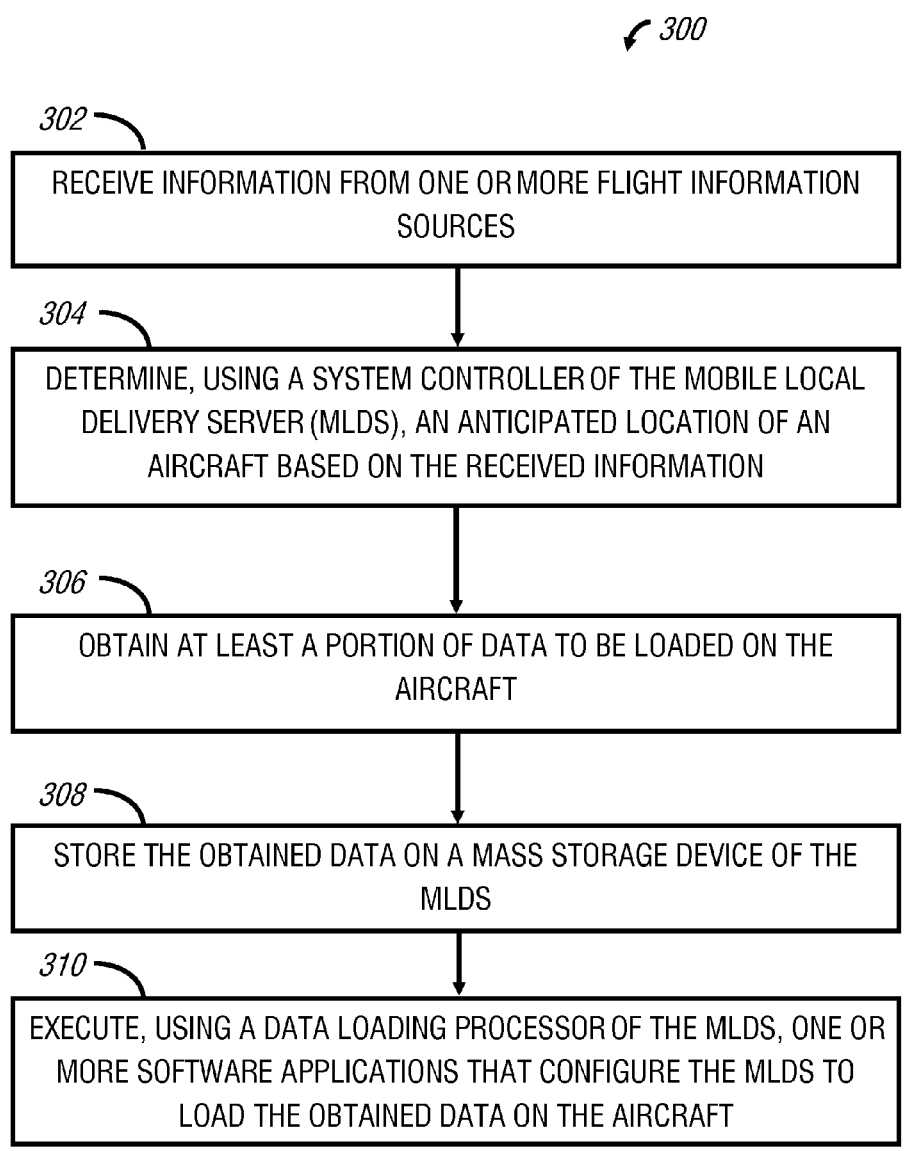
FIG. 3 illustrates a flowchart of a method for operating a mobile local delivery server, according to exemplary embodiments.

FIG. 3 illustrates a flowchart of a method 300 for operating a Mobile Local Delivery Server (MLDS), according to exemplary embodiments. The method 300 may include receiving information from one or more flight information sources, as at 302, determining, using a system controller of the MLDS, an anticipated location of an aircraft based on the received information, as at 304, obtaining at least a portion of data to be loaded on the aircraft, as at 306, storing the obtained data on a mass storage device of the MLDS, as at 308, and executing, using a data loading processor of the MLDS, one or more software applications that configure the MLDS to load the obtained data on the aircraft, as at 310.

Example embodiments may also be directed to a computer-program product for operating the MLDS 100. The computer-program product may include one or more instructions stored on a non-transitory computer-readable medium and executable by one or more processors of the computer via which the computer-readable medium is accessed. A computer-readable media may be any available media that may be accessed by a computer. By way of example, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, when the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

We claim:

1. A mobile local delivery server (MLDS), comprising:
   a communication router;
   a communication interface comprising:
      a first communication protocol configured to receive one or more flight information sources; and
      a second communication protocol configured to transmit the one or more flight information sources to the communication router, wherein the first communication protocol is different from the second communication protocol;
   a system controller communicably coupled with the communication router and configured to operate the MLDS, the system controller being configured to determine an anticipated location of an aircraft based on information received from the one or more flight information sources;
   a data loading processor communicably coupled with the system controller and configured to execute one or more software applications, the one or more software applications configuring the MLDS to exchange the data with the aircraft;
   a mass storage device communicably coupled with the data loading processor and configured to store data exchanged between the MLDS and the aircraft;
   a sensor unit configured to receive one or more signals, wherein the communication router automatically exchanges data with the aircraft based on the one or more signals received by one or more sensors connected to the sensor unit, the one or more signals being indicative of the arrival of the aircraft at the anticipated location;
   one or more antennas configured to exchange the data between the MLDS and the aircraft; and
   a hand-held chassis containing each of the communication router, the communication interface, the system controller, the data loading processor, the mass storage device, the sensor unit, and the one or more antennas.

2. The MLDS of claim 1, wherein the anticipated location of the aircraft is an airport gate at which the aircraft will be parked.

3. The MLDS of claim 1, wherein the anticipated location of the aircraft is on an airport apron.

4. The MLDS of claim 1, wherein the MLDS is configured to exchange data with the aircraft via a direct communication link with the aircraft.

5. The MLDS of claim 1, wherein the one or more flight information sources include at least one of: air traffic control, flight dispatch, flight schedules, or gate assignments.

6. The MLDS of claim 1, wherein the system controller is further configured to determine an anticipated time for which the aircraft will be at the anticipated location.

7. The MLDS of claim 6, wherein, based on at least one of the anticipated location or anticipated time, the system controller is configured to obtain at least a portion of the data to be loaded on the aircraft prior to the aircraft arriving at the anticipated location.

8. The MLDS of claim 1, wherein the one or more software applications are aircraft specific.

9. The MLDS of claim 1, wherein the one or more software applications are aircraft manufacturer specific.

10. The MLDS of claim 1, wherein the data is exchanged using the one or more antennas of the MLDS and a Terminal Wireless LAN Unit on board the aircraft.

11. The MLDS of claim 1, wherein the communication router is configured to receive the information from the one or more flight information sources through the communication interface, and configured to exchange data with the aircraft.

12. A method of operating a mobile local delivery server (MLDS), the method comprising:
   receiving information from one or more flight information sources using a first communication protocol;
   transmitting the received information to a communication router using a second communication protocol, the communication router being contained in the hand-held chassis of the MLDS;
   determining, using a system controller contained in the hand-held chassis and configured to operate the MLDS, an anticipated location of an aircraft based on the received information;
   obtaining at least a portion of data to be loaded on the aircraft;
   storing the obtained data on a mass storage device contained in the hand-held chassis of the MLDS;
   receiving one or more signals in a sensor unit from one or more sensors connected to the sensor unit, the one or more signals being indicative of the arrival of the aircraft at the anticipated location, and the sensor unit being contained in a hand-held chassis of the MLDS;
   executing, using a data loading processor contained in the hand-held chassis of the MLDS, one or more software applications that configure the MLDS to load the obtained data on the aircraft; and
   automatically exchanging the obtained data with the aircraft based on the one or more signals received by the one or more sensors connected to the sensor unit.

13. The method of claim 12, further comprising:
   obtaining at least a portion of data to be loaded on the aircraft prior to the aircraft arriving at the anticipated location.

14. The method of claim 12, wherein the anticipated location of the aircraft is an airport gate at which the aircraft will be parked.

15. The method of claim 12, further comprising:
   determining an anticipated time for which the aircraft will be at the anticipated location.

16. The method of claim 12, wherein the one or more software applications are at least one of aircraft specific and aircraft manufacturer specific.

17. A computer-program product for operating a mobile local delivery server (MLDS), the computer-program product comprising a non-transitory computer-readable medium having instructions stored thereon and which when executed by one or more processors of a computer via which the computer-readable medium is accessed cause the computer to:
 receive information from one or more flight information sources using a first communication protocol;
 transmit the received information to a communication router using a second communication protocol, the communication router being contained in the hand-held chassis of the MLDS;
 determine, using a system controller contained in the hand-held chassis and configured to operate the MLDS, an anticipated location of an aircraft based on the received information;
 obtain at least a portion of data to be loaded on the aircraft prior to the aircraft arriving at the anticipated location;
 store the obtained data on a mass storage device contained in the hand-held chassis of the MLDS;
 receive one or more signals in a sensor unit from one or more sensors connected to the sensor unit, the one or more signals being indicative of the arrival of the aircraft at the anticipated location, and the sensor unit being contained in a hand-held chassis of the MLDS;
 execute, using a data loading processor contained in the hand-held chassis of the MLDS, one or more software applications that configure the MLDS to load the obtained data on the aircraft; and
 automatically exchange the obtained data with the aircraft based on the one or more signals received by the one or more sensors connected to the sensor unit.

18. The computer-program product of claim 17, wherein the instructions further cause the computer to:
 determine an anticipated time for which the aircraft will be at the anticipated location.

19. The computer-program product of claim 17, wherein the one or more software applications are at least one of aircraft specific and aircraft manufacturer specific.

* * * * *